PATENT

US 9,567,923 B2

United States Patent
Tanaka

(10) Patent No.: US 9,567,923 B2
(45) Date of Patent: Feb. 14, 2017

(54) CONTROL DEVICE FOR INTERNAL COMBUSTION ENGINE EQUIPPED WITH SUPERCHARGER

(75) Inventor: Satoru Tanaka, Odawara (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/394,919

(22) PCT Filed: Apr. 19, 2012

(86) PCT No.: PCT/JP2012/060612
§ 371 (c)(1),
(2), (4) Date: Oct. 16, 2014

(87) PCT Pub. No.: WO2013/157126
PCT Pub. Date: Oct. 24, 2013

(65) Prior Publication Data
US 2015/0122234 A1   May 7, 2015

(51) Int. Cl.
*F02B 33/44* (2006.01)
*F02B 33/00* (2006.01)
(Continued)

(52) U.S. Cl.
CPC .......... *F02D 41/0007* (2013.01); *F02B 37/12* (2013.01); *F02B 37/18* (2013.01); *F02B 39/16* (2013.01);
(Continued)

(58) Field of Classification Search
CPC .... F02D 41/0007; F02D 41/18; F02D 41/221; F02D 41/222; F02B 37/12; F02B 37/18; F02B 39/16
(Continued)

(56) References Cited

U.S. PATENT DOCUMENTS 4,672,814 A * 6/1987 Abo et al. .......... 60/602
4,698,972 A * 10/1987 Ueno et al. ........ 60/602
(Continued)

FOREIGN PATENT DOCUMENTS

EP    0769612 A2   4/1997
JP    S64-41629 A   2/1989
(Continued)

*Primary Examiner* — Nicholas J Weiss
*Assistant Examiner* — Ngoc T Nguyen
(74) *Attorney, Agent, or Firm* — Andrews Kurth Kenyon LLP

(57) ABSTRACT

A control device to detect abnormality of a supercharging pressure sensor accurately in an internal combustion engine equipped with a supercharger that can change a supercharging pressure by operation of an actuator. The control device operates an actuator so that a supercharging pressure measured by a supercharging pressure sensor becomes a target supercharging pressure, acquires a measured value of a flow rate of air flowing in an intake passage, and calculates an estimated supercharging pressure based on the measured air flow rate. The control device sets a first abnormality flag when a first simultaneous inequality is established, which is a simultaneous inequality evaluating magnitude correlation between the measured supercharging pressure, the target supercharging pressure and the estimated supercharging pressure, and is not established when the supercharging pressure sensor is normal.

6 Claims, 3 Drawing Sheets

(51) Int. Cl.
*F02D 41/00* (2006.01)
*F02B 37/18* (2006.01)
*F02B 39/16* (2006.01)
*F02D 41/18* (2006.01)
*F02D 41/22* (2006.01)
*F02B 37/12* (2006.01)
*F02B 37/16* (2006.01)

(52) U.S. Cl.
CPC ............. *F02D 41/18* (2013.01); *F02D 41/221* (2013.01); *F02D 41/222* (2013.01); *F02B 37/16* (2013.01); *F02B 2039/162* (2013.01); *F02D 2200/0406* (2013.01); *F02D 2200/0408* (2013.01); *Y02T 10/144* (2013.01); *Y02T 10/40* (2013.01)

(58) Field of Classification Search
USPC ............................ 60/602, 611; 701/102–103
See application file for complete search history.

(56) References Cited

U.S. PATENT DOCUMENTS

| | | | |
|---|---|---|---|
| 5,073,865 A * | 12/1991 | Togai et al. | ............ 701/103 |
| 2006/0225418 A1 | 10/2006 | Kishimoto et al. | |
| 2006/0248889 A1 | 11/2006 | Sagisaka et al. | |
| 2008/0022679 A1 | 1/2008 | Hara et al. | |

FOREIGN PATENT DOCUMENTS

| | | |
|---|---|---|
| JP | H09-96242 A | 4/1997 |
| JP | H11-351042 A | 12/1999 |
| JP | 2000-345851 A | 12/2000 |
| JP | 2006-207509 A | 8/2006 |
| JP | 2007-009877 A | 1/2007 |
| JP | 2010096050 A | 4/2010 |
| JP | 2010-106811 A | 5/2010 |

\* cited by examiner

CONTROL DEVICE FOR INTERNAL COMBUSTION ENGINE EQUIPPED WITH SUPERCHARGER

CROSS-REFERENCE TO RELATED APPLICATIONS

This is a national phase application based on the PCT International Patent Application No. PCT/JP2012/060612 filed Apr. 19, 2012, the entire contents of which are incorporated herein by reference.

TECHNICAL FIELD

The present invention relates to a control device for an internal combustion engine that operates a supercharging pressure controlling actuator so that a supercharging pressure measured by a supercharging pressure sensor reaches a target supercharging pressure, and more particularly relates to a control device equipped with a function of self-diagnosing abnormality relating to supercharging pressure control.

BACKGROUND ART

There is known an internal combustion engine equipped with a supercharger including actuators that can actively change a supercharging pressure, such as a waste gate valve and a variable nozzle. In intake air quantity control of an internal combustion engine of this type, a target supercharging pressure is determined in accordance with a target air quantity, and a manipulated variable of the actuator is feedback-controlled so that a supercharging pressure measured by a supercharging pressure sensor reaches the target supercharging pressure.

In the above described supercharging pressure feedback control, the supercharging pressure sensor plays an important role in controlling the supercharging pressure with high precision. However, there is no guarantee that the supercharging pressure sensor always functions normally, similarly to the cases of other sensors. Any abnormality such as wire breakage, a short circuit, or deterioration of a sensor element sometimes occurs. Even if feedback control based on the output value of the supercharging sensor is performed in such a case, the actual supercharging pressure cannot be caused to follow the target supercharging pressure. Therefore, in the internal combustion engine equipped with a supercharger that performs supercharging pressure feedback control, a self-diagnosis function of capable of diagnosing abnormality of the supercharging sensor quickly and correctly is required.

As the method for diagnosing abnormality of a supercharging pressure sensor, there is known a method disclosed in Japanese Patent Laid-Open No. 2006-207509, for example. According to the method disclosed in the publication, a difference between a reference supercharging pressure in a predetermined load region of an internal combustion engine and a supercharging pressure obtained by measurement by the supercharging pressure sensor is calculated, and when the difference exceeds a predetermined value, it is determined that abnormality occurs to the supercharging pressure sensor.

However, even if the measured supercharging pressure deviates from a reference supercharging pressure, abnormality of the supercharging pressure sensor is not always the cause thereof. When abnormality occurs to the actuator which is used in supercharging pressure control, the supercharging pressure which is obtained by measurement by the supercharging pressure sensor has the value deviating from the reference supercharging pressure. For example, when the waste gate valve is taken as an example as the actuator, if the waste gate valve does not open due to a malfunction, the supercharging pressure cannot be reduced in accordance with the target. In the case like this, the supercharging pressure measured by the supercharging pressure sensor shows a value higher than the reference supercharging pressure, and therefore, according to the method described in the above described publication, an erroneous diagnosis that abnormality occurs to the supercharging pressure sensor is made.

For this reason, the self-diagnosis function included by the control device for an internal combustion engine equipped with a supercharger is required to be able to diagnose abnormality of the supercharging pressure sensor by distinguishing the abnormality of the supercharging pressure sensor from abnormality of the actuator.

Note that as the prior arts relating to the present invention, the arts described in respective Patent Literatures cited as follows including the art described in the above described publication can be cited. For example, Japanese Patent Laid-Open No. 2007-009877 describes determining abnormality of a waste gate valve by calculating a deviation between the target supercharging pressure and the actual supercharging pressure corresponding to the control duty value each time the control duty value with respect to the waste gate valve is changed by a predetermined amount, and comparing the deviation with an abnormality determination value. However, the technique described in the publication is on the precondition that the supercharging pressure sensor is normal, and is not configured to diagnose abnormality of the waste gate valve by distinguishing the abnormality of the waste gate valve from the abnormality of the supercharging pressure sensor.

CITATION LIST

Patent Literature

Patent Literature 1: Japanese Patent Laid-Open No. 2006-207509
Patent Literature 2: Japanese Patent Laid-Open No. 2010-106811
Patent Literature 3: Japanese Patent Laid-Open No. 11-351042
Patent Literature 4: Japanese Patent Laid-Open No. 2007-009877

SUMMARY OF INVENTION

The present invention is made in the light of the aforementioned problem, and has an object to detect abnormality of a supercharging pressure sensor for use in monitoring a supercharging pressure, in an internal combustion engine equipped with a supercharger that can change the supercharging pressure by operation of an actuator. For the object like this, the present invention provides a control device for an internal combustion engine equipped with a supercharger configured to operate as follows.

A control device according to the present invention operates an actuator so that a supercharging pressure measured by a supercharging pressure sensor reaches a target supercharging pressure, acquires a measured value of a flow rate of air flowing in an intake passage of the internal combustion engine, and calculates an estimated supercharging pressure based on the measured air flow rate. For measurement of the air flow rate, an air flow meter can be used, and for calculation of the estimated supercharging pressure based on the measured air flow rate, a physical model can be used.

The estimated supercharging pressure calculated from the measured air flow rate corresponds to a substantially actual supercharging pressure. Therefore, if both the supercharging pressure sensor and the actuator are normal, the measured supercharging pressure, the target supercharging pressure and the estimated supercharging pressure should be substantially equal to one another. However, when abnormality occurs to either the supercharging pressure sensor or the actuator, a difference occurs to the magnitudes between the measured supercharging pressure, the target supercharging pressure and the estimated supercharging pressure. In addition, magnitude correlation between the measured supercharging pressure, the target supercharging pressure and the estimated supercharging pressure differs between the case in which abnormality occurs to the supercharging pressure sensor, and the case in which abnormality occurs to the actuator. Therefore, abnormality of the supercharging pressure sensor is distinguished from abnormality of the actuator and can be accurately detected by evaluating the magnitude correlation also including the estimated supercharging pressure by a simultaneous inequality, instead of simply evaluating the magnitude correlation between the measured supercharging pressure and the target supercharging pressure by one inequality.

Therefore, the control device according to the present invention sets a first abnormality flag when a first simultaneous inequality is established, which is a simultaneous inequality evaluating magnitude correlation between the measured supercharging pressure, the target supercharging pressure and the estimated supercharging pressure and is not established when the supercharging pressure sensor is normal. As a result that the first abnormality flag is set, it can be known that abnormality occurs to the supercharging pressure sensor.

Further, the control device according to the present invention sets a second abnormality flag when a second simultaneous inequality is established, which is a simultaneous inequality evaluating magnitude correlation between the measured supercharging pressure, the target supercharging pressure and the estimated supercharging pressure, is not established simultaneously with the first simultaneous inequality, and is not established when the actuator is normal. As a result that the second abnormality flag is set, it can be known that abnormality occurs to the actuator.

DESCRIPTION OF EMBODIMENTS

Embodiment 1

Embodiment 1 of the present invention will be described with reference to the drawings.

Figure 1:
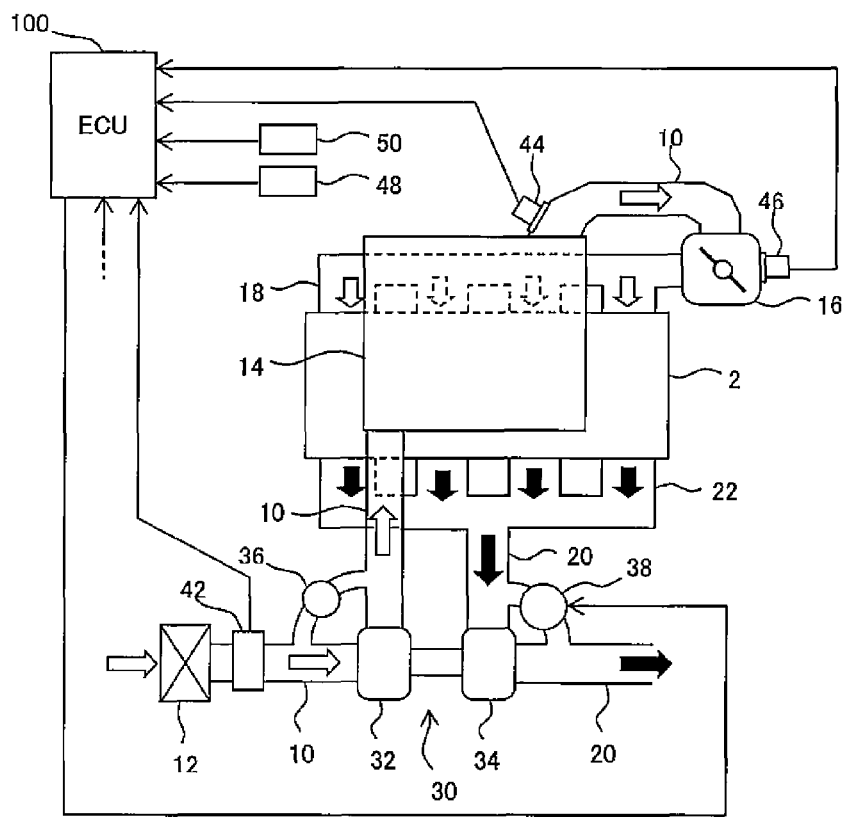
FIG. 1 is a schematic diagram showing a configuration of an internal combustion engine equipped with a supercharger in which a control device according to embodiment 1 of the present invention is used.

An internal combustion engine (hereinafter, an engine) in which a control device according to the present embodiment is used is a supercharging engine having a waste gate valve, and more particularly is a four cycle reciprocating engine that can control torque by adjustment of an air quantity by a throttle. FIG. 1 is a schematic diagram showing a configuration of the supercharging engine in which the control device according to the present embodiment is used. The supercharging engine according to the present embodiment includes a turbo supercharger 30 that is constituted of a compressor 32 provided in an intake passage 10 and a turbine 34 provided in an exhaust passage 20. The intake passage 10 is connected to an intake manifold 18 that is mounted to an engine main body 2. An air cleaner 12 is provided at an inlet of the intake passage 10, and an air flow meter 42 for measuring an air flow rate is disposed downstream of the air cleaner 12 and upstream of the compressor 32. An intercooler 14 is provided between the compressor 32 and a throttle 16 in the intake passage 10. A supercharging pressure sensor 44 for measuring a pressure at an upstream part from the throttle 16, namely, a supercharging pressure is mounted to an outlet of the intercooler 14. Further, the intake passage 10 is provided with an air bypass valve 36 that causes air to recirculate by bypassing the compressor 32 to an upstream side from a downstream side of the compressor 32. The exhaust passage 20 is connected to an exhaust manifold 22 that is mounted to the engine main body 2. The exhaust passage 20 is provided with a waste gate valve 38 for causing an exhaust gas to flow by bypassing the turbine 34. The waste gate valve 38 is a waste gate valve adapted to active control, which is driven by E-VRV (Electric Vacuum Regulating Valve).

The control device according to the present embodiment is realized as a part of a function of an ECU (Electronic Control Unit) 100 that controls the supercharging engine. Various kinds of information and signals relating to an operation state and operation conditions of the engine are inputted to the ECU 100 from various sensors such as a throttle opening degree sensor 46, an engine speed sensor 48, and an accelerator opening degree sensor 50 besides the air flow meter 42 and the supercharging pressure sensor 44. The ECU 100 operates various actuators such as the throttle 16 and the waste gate valve 38 based on those kinds of information and signals. In regard with the waste gate valve 38, an instruction opening degree is supplied to the E-VRV from the ECU 100. The E-VRV is operated in accordance with the instruction opening degree, whereby the waste gate valve 38 is moved to an optional opening degree.

Figure 2:
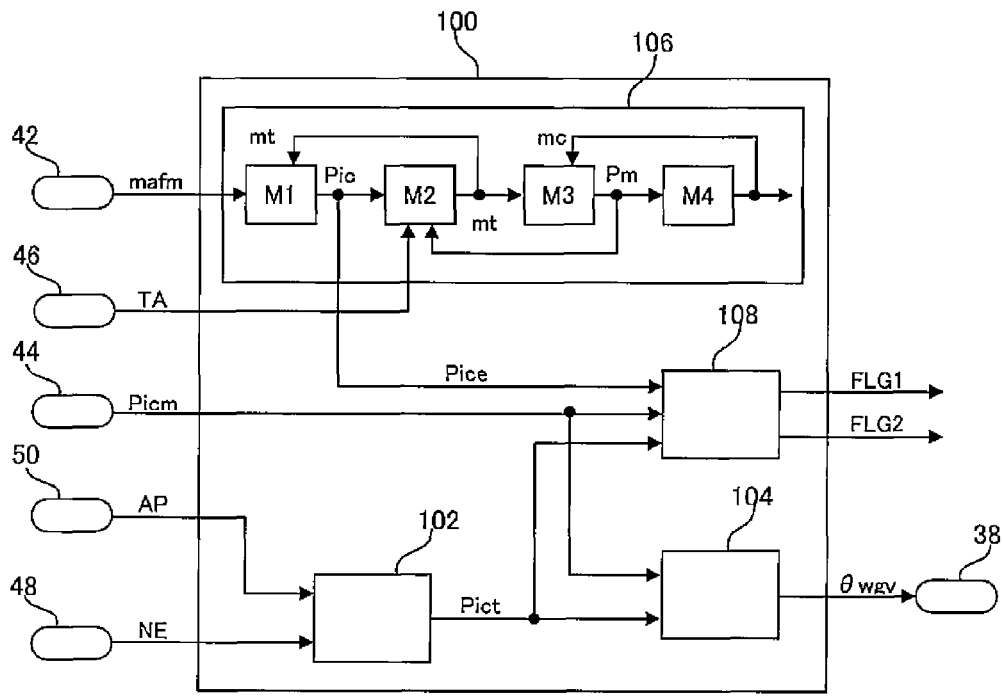
FIG. 2 is a block diagram showing a configuration of the control device according to embodiment 1 of the present invention.

A block diagram in FIG. 2 shows a configuration of the ECU 100 as the control device according to the present embodiment. According to the configuration shown in FIG.

2, the ECU 100 is configured by a target supercharging pressure calculating unit 102, a feedback controller 104, a supercharging pressure estimating unit 106 and an abnormality diagnosing unit 108. However, these elements 102, 104, 106 and 108 are expressed in the diagram with attention paid to only the elements relating to supercharging pressure feedback control and abnormality diagnosis among various functions that the ECU 100 has. Accordingly, FIG. 2 does not mean that the ECU 100 is configured by only these elements. Note that the ECU 100 is a computer for an automobile, and the respective elements are virtually realized when software stored in a memory is executed by a CPU.

The target supercharging pressure calculating unit 102 calculates a target supercharging pressure Pict for supercharging pressure feedback control. In calculation of the target supercharging pressure Pict, an engine speed NE measured by the engine speed sensor 48, and an accelerator pedal opening degree AP measured by the accelerator opening degree sensor 50 are used. The target supercharging pressure calculating unit 102 determines a target air quantity based on these kinds of information, and determines the target supercharging pressure Pict in accordance with the target air quantity.

The feedback controller 104 determines an instruction opening degree θwgv that is a manipulated variable of the waste gate valve 38 by feedback control. In the feedback control, a difference between the target supercharging pressure Pict calculated in the target supercharging pressure calculating unit 102, and a supercharging pressure Picm that is measured by the supercharging pressure sensor 44 is calculated. Subsequently, an instruction opening degree θwgv is calculated by PI control to a difference between the target supercharging pressure Pict and the measured supercharging pressure Picm.

The supercharging pressure estimating unit 106 calculates an estimated supercharging pressure Pice based on an air flow rate mafm that is measured by the air flow meter 42. In calculation of the estimated supercharging pressure Pice, a physical model in which a behavior of air in the supercharging engine is physically modeled is used. The physical model is configured by a plurality of element models, that is, an intercooler model M1, a throttle model M2, an intake manifold model M3 and an intake valve model M4. Hereinafter, contents of the respective element models that are used in calculation of the estimated supercharging pressure Pice will be described. Note, however, these element models are respectively known to the public, the element models themselves are not the feature point in the present invention, and therefore, description of details of the respective element models such as mathematical expressions and maps will be omitted.

The intercooler model M1 is a physical model that is constructed based on a conservation law concerning air in the intercooler 14 in the intake passage 10. As the intercooler model M1, an expression of a law of conservation of energy and an expression of a law of conservation of flow rate are used specifically. In the intercooler model M1, the air flow rate mafm that is measured by the air flow meter 42 is used as a flow rate of air that flows into the intercooler 14, and a throttle flow rate mt that is calculated in the throttle model M2 that will be described later is used as a flow rate of air that flows out from the intercooler 14. Subsequently, a supercharging pressure Pic as a throttle upstream pressure is calculated based on input information thereof.

The throttle model M2 is a model for calculating a flow rate of air that passes through the throttle 16, and more specifically, a flow rate expression of an orifice with a differential pressure across the throttle 16, a channel area determined by a throttle opening degree, and a flow rate coefficient as a basis is used. In the throttle model M2, information of a throttle opening degree TA measured by the throttle opening degree sensor 46, the supercharging pressure Pic calculated in the intercooler model M1, an intake manifold pressure Pm calculated in the intake manifold model M3 that will be described later and the like is inputted, and from the input information thereof, the throttle flow rate mt is calculated.

The intake manifold model M3 is a physical model that is constructed based on a law of conservation concerning air in the intake manifold 18. More specifically, as the intake manifold model M3, the expression of a law of conservation of energy and the expression of a law of conservation of a flow rate are used. In the intake manifold model M3, information of the throttle flow rate mt calculated in the throttle model M2, an intake valve flow rate mc calculated in the intake valve model M4 which will be described later and the like is inputted, and an intake manifold pressure Pm is calculated from the input information thereof.

The intake valve model M4 is a model based on a result of an experiment examining a relationship between an intake valve flow rate and the intake manifold pressure. By an empirical rule obtained by the experiment, a relationship of the intake valve flow rate and the intake manifold pressure is approximated by a straight line in the intake valve model M4. A coefficient of the equation of the straight line is not a constant, but is a variable that is determined by an engine speed, a waste gate valve opening degree, valve timing of the intake valve, valve timing of the exhaust valve and the like. In the intake valve model M4, information of the engine speed NE and the waste gate valve instruction opening degree θwgv and the like is inputted, besides the intake manifold pressure Pm that is calculated in the intake manifold model M3, and an intake valve flow rate mc is calculated from the input information thereof.

The ECU 100 takes out the supercharging pressure Pic calculated in the intercooler model M1 as the estimated supercharging pressure Pice, out of various parameters calculated in the supercharging pressure estimating unit 106.

The abnormality diagnosing unit 108 diagnoses abnormality of devices relating to supercharging pressure control, that is, the supercharging pressure sensor 44 and the waste gate valve 38. Abnormality of the supercharging pressure sensor 44 and abnormality of the waste gate valve 38 are distinguished. When abnormality arises in the supercharging pressure sensor 44, the abnormality diagnosing unit 108 sets a first abnormality flag FLG1 (sets a value of the flag FLG1 at one), and when abnormality arises in the waste gate valve 38, the abnormality diagnosing unit 108 sets a second abnormality flag FLG2 (sets a value of the flag FLG2 at one). In abnormality diagnosis by the abnormality diagnosing unit 108, the target supercharging pressure Pict calculated in the target supercharging pressure calculating unit 102, the measured supercharging pressure Picm measured by the supercharging pressure sensor 44, and the estimated supercharging pressure Pice estimated in the supercharging pressure estimating unit 106 are used. Hereinafter, a method for diagnosing abnormality using the information thereof will be described with use of the drawings.

The ECU 100 performs supercharging pressure feedback control by the feedback controller 104, and therefore, if the supercharging pressure sensor 44 and the waste gate valve 38 are both normal, the actual supercharging pressure should substantially correspond to the target supercharging pressure Pict. Here, what corresponds to the actual supercharging pressure are the measured supercharging pressure Picm that is directly measured by the supercharging pressure sensor 44, and the estimated supercharging pressure Pice which is calculated based on the measured air flow rate mafm. Therefore, if the supercharging pressure sensor 44 and the waste gate valve 38 are both normal, the target supercharging pressure Pict, the measured supercharging pressure Picm and the estimated supercharging pressure Pice should substantially correspond to one another.

However, if the waste gate valve 38 does not operate in accordance with the instruction opening degree θwgv due to any abnormality, the actual supercharging pressure cannot be caused to correspond to the target supercharging pressure Pict. As a result, the measured supercharging pressure Picm corresponding to the actual supercharging pressure significantly deviates from the target supercharging pressure Pict. Meanwhile, the estimated supercharging pressure Pice is an estimated value of the actual supercharging pressure that is calculated based on the measured air flow rate mafm, and therefore, the estimated supercharging pressure Pice is within a constant error range with respect to the measured supercharging pressure Picm, irrespective of absence or presence of abnormality of the waste gate valve 38.

Figure 3:
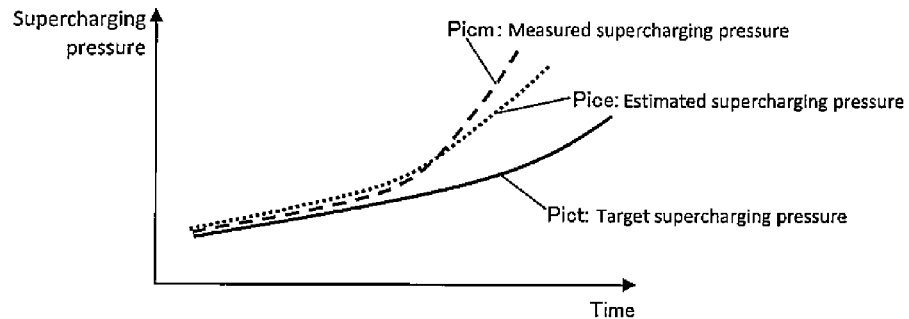
FIG. 3 is a diagram showing respective behaviors of a measured supercharging pressure in a case of abnormality occurring to a waste gate valve, a target supercharging pressure, and an estimated supercharging pressure.

FIG. 3 shows a relationship of the target supercharging pressure Pict, the measured supercharging pressure Picm and the estimated supercharging pressure Pice in a case in which the waste gate valve 38 is closed more than the instruction opening degree θwgv. When the waste gate valve 38 is closed more than the instruction opening degree θwgv, the actual supercharging pressure becomes larger than the target supercharging pressure Pict. As a result, the measured supercharging pressure Picm that is the measured value of the actual supercharging pressure becomes larger than the target supercharging pressure Pict. If the supercharging pressure becomes large, the air flow rate also becomes large, and therefore, the estimated supercharging pressure Pice that is calculated based on the measured air flow rate mafm also becomes larger than the target supercharging pressure Pict. In contrary thereto, when the waste gate valve 38 is opened more than the instruction opening degree θwgv, the measured supercharging pressure Picm becomes smaller than the target supercharging pressure Pict due to insufficient supercharging. If the supercharging pressure becomes insufficient, the air flow rate also becomes small, and therefore, the estimated supercharging pressure Pice which is calculated based on the measured air flow rate mafm also becomes smaller than the target supercharging pressure Pict.

Meanwhile, when abnormality occurs to the supercharging pressure sensor 44, the measured supercharging pressure Picm which is obtained from the output value from the supercharging pressure sensor 44 and the estimated supercharging pressure Pice which is calculated based on the measured air flow rate mafm do not correspond to each other, and both deviate from each other to exceed a constant error range. Furthermore, when abnormality occurs to the supercharging pressure sensor 44, proper supercharging pressure feedback control cannot be performed similarly to the case in which abnormality occurs to the waste gate valve 38, and the actual supercharging pressure cannot be caused to correspond to the target supercharging pressure Pict. As a result, the estimated supercharging pressure Pice which is the estimated value of the actual supercharging pressure and the target supercharging pressure Pict significantly deviate from each other.

Figure 4:
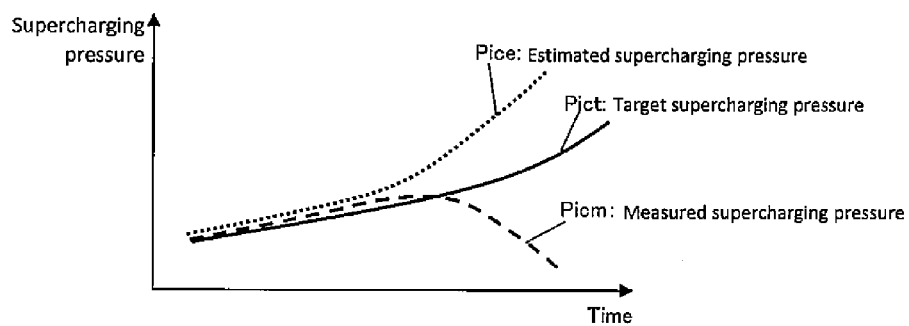
FIG. 4 is a diagram showing respective behaviors of a measured supercharging pressure in a case of abnormality occurs to a supercharging pressure sensor, a target supercharging pressure and an estimated supercharging pressure.

FIG. 4 shows a relationship of the target supercharging pressure Pict, the measured supercharging pressure Picm and the estimated supercharging pressure Pice in a case in which the measured supercharging pressure Picm does not show a correct value due to abnormality of the supercharging pressure sensor 44, and the measured supercharging pressure Picm has a value smaller than the actual value. In the supercharging pressure feedback control, the instruction opening degree θwgv of the waste gate valve 38 is determined so as to eliminate the difference between the measured supercharging pressure Picm and the target supercharging pressure Pict, and therefore, when the measured supercharging pressure Picm shows a value smaller than an actual value, the actual supercharging pressure that is realized by the supercharging pressure feedback control becomes larger than the target supercharging pressure Pict. If the supercharging pressure becomes larger, the air flow rate also becomes larger, and therefore, the estimated supercharging pressure Pice which is calculated based on the measured air flow rate mafm becomes larger than the target supercharging pressure Pict. Namely, in this case, while the measured supercharging pressure Picm becomes smaller than the target supercharging pressure Pict, the estimated supercharging pressure Pice becomes larger than the target supercharging pressure Pict. In contrast with this, when the measured supercharging pressure Picm is a value that is larger than the actual value, the supercharging pressure feedback control is performed based on the inaccurate measured supercharging pressure Picm, and as a result, the estimated supercharging pressure Pice becomes smaller than the target supercharging pressure Pict while the measured supercharging pressure Picm becomes larger than the target supercharging pressure Pict.

As is understandable from the above example, when abnormality occurs to either the supercharging pressure sensor 44 or the waste gate valve 38, a large difference occurs between the target supercharging pressure Pict, the measured supercharging pressure Picm and the estimated supercharging pressure Pice. In addition, magnitude correlation between the target supercharging pressure Pict, the measured supercharging pressure Picm and the estimated supercharging pressure Pice differs between a case in which abnormality occurs to the supercharging pressure sensor 44 and a case in which abnormality occurs to the waste gate valve 38.

For the above reason, in regard with the magnitude correlation between the target supercharging pressure Pict, the measured supercharging pressure Picm and the estimated supercharging pressure Pice, an inequality that is not established when abnormality occurs to the waste gate valve 38, and is established only when the waste gate valve 38 is normal and abnormality occurs to the supercharging pressure sensor 44 is conceivable. Further, an inequality that is not established when abnormality occurs to the supercharging pressure sensor 44, and is established only when the supercharging pressure sensor 44 is normal and abnormality occurs to the waste gate valve 38 is also conceivable. Note, however, that these inequalities are not single expressions, but should be simultaneous inequalities that are each constituted of at least two inequalities. This is because an inequality for diagnosing whether abnormality occurs or not, and an inequality for diagnosing whether the abnormality occurs to the supercharging pressure sensor 44 or the waste gate valve 38 are necessary.

In the present embodiment, the aforementioned simultaneous inequalities are set as follows. First, a first simultaneous inequality for determining that abnormality occurs to the supercharging pressure sensor 44 is as follows. The simultaneous inequality is a combination of an expression (1A) that indicates that a magnitude of a difference between the target supercharging pressure Pict and the measured supercharging pressure Picm is larger than a first threshold value α, and an expression (1B) that indicates that a magnitude of a difference between the measured supercharging pressure Picm and the estimated supercharging pressure Pice is larger than a second threshold value β.

$$|Pict-Picm|>\alpha \qquad \text{expression (1A)}$$

$$|Picm-Pice|>\beta \qquad \text{expression (1B)}$$

Next, a second simultaneous inequality for determining that abnormality occurs to the waste gate valve 38 is as follows. The simultaneous inequality is a combination of an expression (2A) that indicates that the magnitude of the difference between the target supercharging pressure Pict and the measured supercharging pressure Picm is larger than the first threshold value α, and an expression (2B) that indicates that the magnitude of the difference between the measured supercharging pressure Picm and the estimated supercharging pressure Pice is the second threshold value β or less. As is understandable from the relationship of the expression (2B) configuring the second simultaneous inequality and the expression (1B) configuring the first simultaneous inequality, these two simultaneous inequalities are not established simultaneously.

$$|Pict-Picm|>\alpha \qquad \text{expression (2A)}$$

$$|Picm-Pice|\leq\beta \qquad \text{expression (2B)}$$

The values of the threshold values α and β in the above described respective simultaneous inequalities are determined by adaptation by using a real engine. When the above described first simultaneous inequality is established, the abnormality diagnosing unit 108 sets the value of the first abnormality flag FLG1 at one. Meanwhile, when the above described second simultaneous inequality is established, the abnormality diagnosing unit 108 sets the value of the second abnormality flag FLG2 at one.

Figure 5:
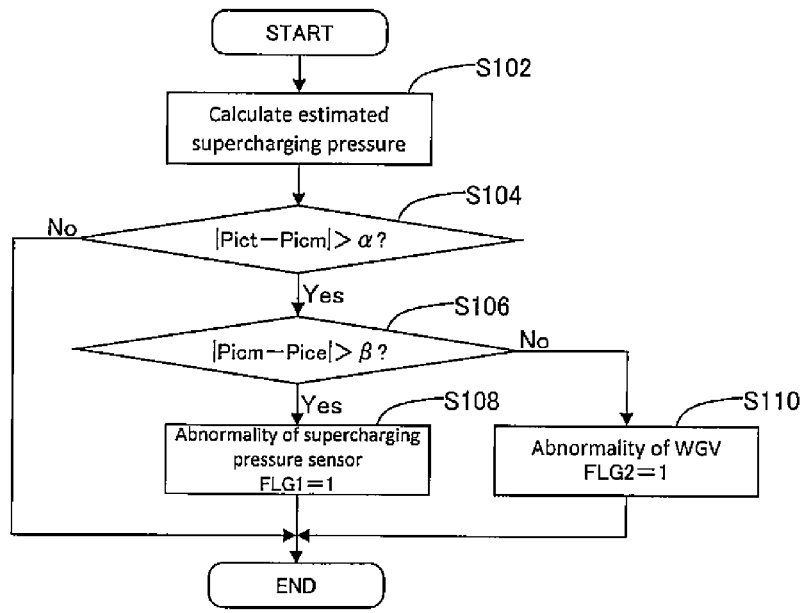
FIG. 5 is a flowchart showing a routine for abnormality diagnosis that is executed by the control device according to embodiment 1 of the present invention.

The method for diagnosing abnormality described above is carried out by the ECU 100 executing the routine shown in the flowchart in FIG. 5. Execution of the abnormality diagnosis routine by the ECU 100 is performed at each control period. In the first step S102 of the abnormality diagnosis routine, the estimated supercharging pressure Pice is calculated based on the air flow rate mafm measured by the air flow meter 42.

In the next step S104, it is determined whether or not the magnitude of the difference between the target supercharging pressure Pict and the measured supercharging pressure Picm is larger than the first threshold value α. If the determination result is negative, it can be determined that abnormality does not occur to the supercharging pressure sensor 44 and the waste gate valve 38. Therefore, when the determination result of step S104 is negative, the values of both the flags FLG1 and FLG2 are kept to be zero.

When the determination result in step S104 is affirmative, determination of step S106 is further performed. In step S106, it is determined whether or not the magnitude of the difference between the measured supercharging pressure Picm and the estimated supercharging pressure Pice is larger than the second threshold value β. If the determination result is affirmative, the processing by the ECU 100 proceeds to step S108. In step S108, the value of the first abnormality flag FLG1 indicating that abnormality occurs to the supercharging pressure sensor 44 is set at one. Meanwhile, if the determination result of step S106 is negative, the processing by the ECU 100 proceeds to step S110. In step S110, the value of the second abnormality flag FLG2 indicating that abnormality occurs to the waste gate valve (WGV) 38 is set at one.

Note that when either the abnormality flag FLG1 or FLG2 is set, the ECU 100 lights a lamp indicating abnormality that is provided at an instrument panel, and stores an abnormality code showing which of the supercharging pressure sensor 44 and the waste gate valve 38 has the abnormality into a memory. The stored abnormality code is read by a diagnosis device at a time of inspection of the vehicle, and a vehicle mechanic looks at the abnormality cord displayed on the diagnosis device to identify where abnormality occurs.

Embodiment 2

Next, embodiment 2 of the present invention will be described with reference the drawings.

A control device according to the present embodiment is used in a supercharging engine configured as in FIG. 1, and is realized as a part of the function of the ECU 100 which controls the supercharging engine, similarly to embodiment 1. Further, the ECU 100 as the control device has a configuration shown in FIG. 2 similarly to embodiment 1.

A difference between the control device according to the present embodiment and the control device according to embodiment 1 lies in the method for diagnosing abnormality by the ECU 100 as the control device. In more detail, simultaneous inequalities for use in abnormal diagnosis differs from the simultaneous inequalities in embodiment 1. First, as a first simultaneous inequality for determining that abnormality occurs to the supercharging pressure sensor 44, a simultaneous inequality constituted of an expression (3A) and an expression (3B) as follows is used in the present embodiment. The expression (3A) is an inequality that indicates that the magnitude of the difference between the measured supercharging pressure Picm and the estimated supercharging pressure Pice is larger than a third threshold value γ, and the expression (3B) is an inequality that indicates that signs of respective errors of the measured supercharging pressure Picm and the estimated supercharging pressure Pice with respect to the target supercharging pressure Pict are different signs. As shown in the example in FIG. 4, when the supercharging pressure feedback control is performed in a situation in which abnormality occurs to the supercharging pressure sensor 44, the measured supercharging pressure Picm and the estimated supercharging pressure Pice significantly deviate from each other, and magnitude correlation of the measures supercharging pressure Picm with respect to the target supercharging pressure Pict, and magnitude correlation of the estimated supercharging pressure Pice with respect to the target supercharging pressure Pict are opposite to each other. The first simultaneous inequality constituted of the expression (3A) and the expression (3B) is a simultaneous inequality that is established in the situation like this.

$$|Picm-Pice|>\gamma \qquad \text{expression (3A)}$$

$$(Pict-Picm)\times(Pict-Pice)<0 \qquad \text{expression (3B)}$$

Next, as a second simultaneous inequality for determining that abnormality occurs to the waste gate valve 38, a simultaneous inequality constituted of an expression (4A) and an expression (4B) as follows is used in the present embodiment. Expression (4A) is an inequality that indicates that the magnitude of the difference between the target supercharging pressure Pict and the measured supercharging pressure Picm is larger than a fourth threshold value $\delta$, and the expression (4B) is an inequality that indicates that signs of the respective errors of the measured supercharging pressure Picm and the estimated supercharging pressure Pice with respect to the target supercharging pressure Pict are the same signs. As shown in the example of FIG. 3, when supercharging pressure feedback control is performed under the situation where abnormality occurs to the waste gate valve 38, the estimated supercharging pressure Pice is within a constant error range with respect to the measured supercharging pressure Picm, though the target supercharging pressure Pict and the measured supercharging pressure Picm significantly deviates from each other. The second simultaneous inequality constituted of the expression (4A) and the expression (4B) is a simultaneous inequality that is established under the situation like this. Note that as is understandable from relationship of the expression (4B) that configures the second simultaneous inequality and the expression (3B) that configures the first simultaneous inequality, these two simultaneous inequalities are not established simultaneously.

$$|Pict-Picm|>\delta \qquad \text{expression (4A)}$$

$$(Pict-Picm)\times(Pict-Pice)>0 \qquad \text{expression (4B)}$$

The values of the threshold values $\gamma$ and $\delta$ in the respective simultaneous inequalities as described above are determined by adaptation using a real engine. When the above described first simultaneous inequality is established, the abnormality diagnosing unit 108 sets the value of the first abnormality flag FLG1 at one. Meanwhile, when the above described second simultaneous inequality is established, the abnormality diagnosing unit 108 sets the value of the abnormality flag FLG2 at one.

Figure 6:
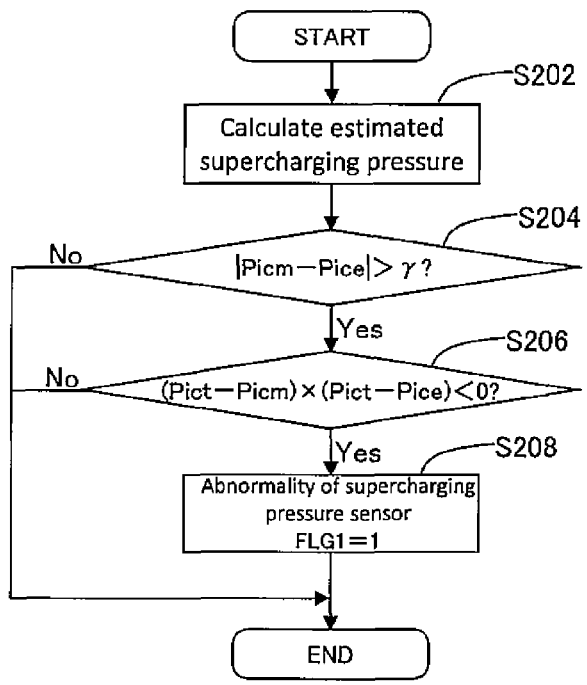
FIG. 6 is a flowchart showing a routine for abnormality diagnosis that is executed by a control device according to embodiment 2 of the present invention.
Figure 7:
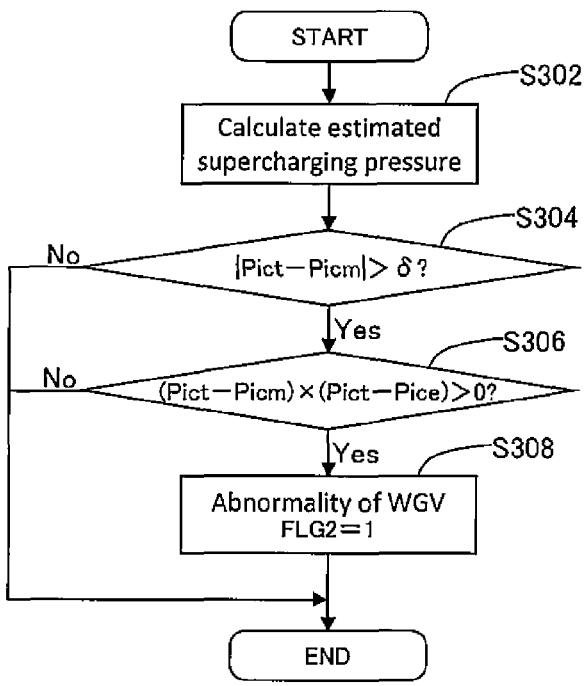
FIG. 7 is a flowchart showing a routine for abnormality diagnosis that is executed by the control device according to embodiment 2 of the present invention.

The method for diagnosing abnormality described above is carried out by the ECU 100 executing a routine shown in a flowchart in FIG. 6, and a routine shown in a flowchart in FIG. 7 respectively. The routine shown in the flowchart in FIG. 6 is a routine for diagnosing abnormality of the supercharging pressure sensor 44, and the ECU 100 executes the routine at each control period. In a first step S202 of the abnormality diagnosis routine, the estimated supercharging pressure Pice is calculated based on the air flow rate mafm that is measured by the air flow meter 42.

In a next step S204, it is determined whether the above described expression (3A) is established or not. If the determination result is negative, it can be determined that abnormality does not occur to the supercharging pressure sensor 44, and therefore, the value of the first abnormality flag FLG1 is kept to be zero.

When the determination result of step S204 is affirmative, determination of step S206 is further performed. In step S206, it is determined whether or not the above described expression (3B) is established. If the determination result is negative, it can be determined that abnormality does not occur to the supercharging pressure sensor 44, and therefore, the value of the first abnormality flag FLG1 is kept to be zero. Meanwhile, if the determination result of step S206 is affirmative, the processing by the ECU 100 proceeds to step S208. In step S208, the value of the first abnormality flag FLG1 that indicates that abnormality occurs to the supercharging pressure sensor 44 is set at one.

The routine shown in the flowchart of FIG. 7 is a routine for diagnosing abnormality of the waste gate valve 38, and the ECU 100 also executes the routine at each control period. In the first step S302 of the abnormality diagnosis routine, the estimated supercharging pressure Pice is calculated based on the air flow rate mafm that is measured by the air flow meter 42.

In next step S304, it is determined whether or not the above described expression (4A) is established. If the determination result is negative, it can be determined that abnormality does not occur to the waste gate valve 38, and therefore, the value of the second abnormality flag FLG2 is kept to be zero.

When the determination result of step S304 is affirmative, determination of step S306 is further performed. In step S306, it is determined whether or not the above described equation (4B) is established . . . .

Others

The present invention is not limited to the aforementioned embodiments, and can be carried out by being variously modified within the range without departing from the gist of the present invention. For example, in embodiment 2, in place of the expression (3A) configuring the first simultaneous inequality, the same inequality as the expression (4A) configuring the second simultaneous inequality may be used.

Further, while the supercharging engines according to embodiments 1 and 2 each includes the waste gate valve, the actuator that changes supercharging pressure may be a variable nozzle of a variable displacement turbo supercharger.

REFERENCE SIGNS LIST

2 Engine main body
10 Intake passage
20 Exhaust passage
30 Turbo supercharger
32 Compressor
34 Turbine
38 Waste gate valve
42 Air flow meter
44 Supercharging pressure sensor
100 ECU (Control device)
102 Target supercharging pressure calculating unit
104 Feedback controller
106 Supercharging pressure estimating unit
108 Abnormality diagnosing unit
M1 Intercooler model
M2 Throttle model
M3 Intake manifold model
M4 Intake valve model

The invention claimed is:

1. An internal combustion engine, comprising:
a supercharger that changes a supercharging pressure by operation of an actuator, and
a control device configured to operate the actuator so that a measured supercharging pressure obtained by a supercharging pressure sensor reaches a target supercharging pressure,
wherein the control device includes a computer for executing software stored therein, the computer programmed to:
acquire a measured value of an air flow rate in an intake passage of the internal combustion engine;
calculate an estimated supercharging pressure based on the measured air flow rate; and
set a first abnormality flag when a first simultaneous inequality is established, the first simultaneous inequality evaluates magnitude correlations between the measured supercharging pressure, the target supercharging pressure and the estimated supercharging pressure, wherein the first simultaneous inequality is not established when the supercharging pressure sensor is normal, wherein, when the first abnormality flag is set, the control device lights a lamp indicating abnormality.

2. The internal combustion engine equipped with a supercharger according to claim 1, wherein the computer is further programmed to set a second abnormality flag when a second simultaneous inequality is established, the second simultaneous inequality evaluates magnitude correlations between the measured supercharging pressure, the target supercharging pressure and the estimated supercharging pressure, wherein the second simultaneous inequality is not established simultaneously with the first simultaneous inequality and the second simultaneous inequality is not established when the actuator is normal.

3. The internal combustion engine according to claim 2, wherein the first simultaneous inequality is a combination of an expression that indicates that a magnitude of a difference between the target supercharging pressure and the measured supercharging pressure is larger than a first threshold value, and an expression that indicates that a magnitude of a difference between the measured supercharging pressure and the estimated supercharging pressure is larger than a second threshold value, and the second simultaneous inequality is a combination of an expression that indicates that the magnitude of the difference between the target supercharging pressure and the measured supercharging pressure is larger than the first threshold value, and an expression that indicates that the magnitude of the difference between the measured supercharging pressure and the estimated supercharging pressure is less than or equal to the second threshold value.

4. The internal combustion engine according to claim 2, wherein the first simultaneous inequality is a combination of an expression that indicates that a magnitude of a difference between the measured supercharging pressure and the estimated supercharging pressure is larger than a third threshold value, and an expression that indicates that signs of respective errors of the measured supercharging pressure and the estimated supercharging pressure with respect to the target supercharging pressure are different signs, and the second simultaneous inequality is a combination of an expression that indicates that a magnitude of a difference between the target supercharging pressure and the measured supercharging pressure is larger than a fourth threshold value, and an expression that indicates that signs of respective errors of the measured supercharging pressure and the estimated supercharging pressure with respect to the target supercharging pressure are the same.

5. The internal combustion engine according to claim 1, wherein the first simultaneous inequality is a combination of an expression that indicates that a magnitude of a difference between the target supercharging pressure and the measured supercharging pressure is larger than a first threshold value, and an expression that indicates that a magnitude of a difference between the measured supercharging pressure and the estimated supercharging pressure is larger than a second threshold value.

6. The internal combustion engine equipped with a supercharger according to claim 1, wherein the first simultaneous inequality is a combination of an expression that indicates that a magnitude of a difference between the measured supercharging pressure and the estimated supercharging pressure is larger than a third threshold value, and an expression that indicates that signs of respective errors of the measured supercharging pressure and the estimated supercharging pressure with respect to the target supercharging pressure are different.

* * * * *

UNITED STATES PATENT AND TRADEMARK OFFICE
CERTIFICATE OF CORRECTION

PATENT NO. : 9,567,923 B2  
APPLICATION NO. : 14/394919  
DATED : February 14, 2017  
INVENTOR(S) : Satoru Tanaka Page 1 of 1

It is certified that error appears in the above-identified patent and that said Letters Patent is hereby corrected as shown below:

In the Specification

At Column 12, Line 13, change the content from:
"(4B) is established..."
To:
"(4B) is established. If the determination result is negative, it can be determined that abnormality does not occur to the waste gate valve 38, and therefore, the value of the second abnormality flag FLG1 is kept to be zero. Meanwhile, if the determination result of step S306 is affirmative, the processing by the ECU 100 proceeds to step S308. In step S308, the value of the second abnormality flag FLG2 that indicates that abnormality occurs to the waste gate valve 38 is set at one."

Signed and Sealed this
Thirty-first Day of July, 2018

Andrei Iancu
*Director of the United States Patent and Trademark Office*